US011291336B2

(12) United States Patent
Marais et al.

(10) Patent No.: US 11,291,336 B2
(45) Date of Patent: Apr. 5, 2022

(54) COFFEE BEAN PACKAGE ASSEMBLY (71) Applicants: Jessica Jill Porter Marais, San Jose, CA (US); Zachary Charles Jacobson, San Luis Obispo, CA (US); Jack Steven Tyson, Santa Ana, CA (US)

(72) Inventors: Jessica Jill Porter Marais, San Jose, CA (US); Zachary Charles Jacobson, San Luis Obispo, CA (US); Jack Steven Tyson, Santa Ana, CA (US)

( * ) Notice: Subject to any disclaimer, the term of this patent is extended or adjusted under 35 U.S.C. 154(b) by 0 days.

(21) Appl. No.: 16/900,700

(22) Filed: Jun. 12, 2020

(65) Prior Publication Data

US 2021/0386246 A1 Dec. 16, 2021

(51) Int. Cl.
*A47J 42/50* (2006.01)
*A23F 5/08* (2006.01)
*B65B 25/00* (2006.01)

(52) U.S. Cl.
CPC .............. *A47J 42/50* (2013.01); *A23F 5/08* (2013.01); *B65B 25/001* (2013.01)

(58) Field of Classification Search
CPC .... A23F 5/08; A47J 42/50; A47J 42/00; A47J 42/02; A47J 42/04; A47J 42/06; A47J 42/08; A47J 42/10; A47J 42/12; A47J 42/14; A47J 42/16; A47J 42/18; A47J 42/20; A47J 42/22; A47J 42/24; A47J 42/26; A47J 42/28; A47J 42/30; A47J 42/32; A47J 42/34; A47J 42/36; A47J 42/38; A47J 42/40; A47J 42/42; A47J 42/44; A47J 42/46; A47J 42/48; A47J 42/52; A47J 42/54; A47J 42/56; B65B 25/001; A23N 12/083; B65D 81/263; B65D 75/30; B65D 77/225; B65D 33/01; B65D 25/54; B65D 90/34; B65D 31/10; B31B 70/266
See application file for complete search history.

(56) References Cited

U.S. PATENT DOCUMENTS

| 2,071,745 | A | * | 2/1937 | Higginbottom | ........ B65D 33/30 383/61.1 |
| 2,138,204 | A | * | 11/1938 | Rabl | ...................... A47J 42/18 241/259.3 |
| 3,734,417 | A | | 5/1973 | Russell et al. | |
| 4,026,490 | A | | 5/1977 | Johansson | |
| 4,522,298 | A | | 6/1985 | Weinberger | |
| 4,651,877 | A | | 3/1987 | de Mooy | |
| 4,856,681 | A | | 8/1989 | Murray | |
| 5,088,652 | A | | 2/1992 | Chen | |

(Continued)

FOREIGN PATENT DOCUMENTS

GB           2392899 A       3/2004

*Primary Examiner* — Ericson M Lachica
(74) *Attorney, Agent, or Firm* — Schwegman Lundberg & Woessner, P.A.

(57) ABSTRACT

Some examples described herein include coffee bean packaging assemblies that integrate a packaging body with a grinding mechanism (e.g., a burr grinder). The example coffee bean assemblies described provide storage advantages (e.g., coffee beans and grinders do not need to be separately stored and located when wanting to dispense freshly ground coffee), as well as travel advantages (e.g., a separate coffee grinder does not need to be remembered packed when traveling).

8 Claims, 8 Drawing Sheets

(56) References Cited

U.S. PATENT DOCUMENTS

| | | | |
|---|---|---|---|
| 5,125,542 A * | 6/1992 | Blanc | B65D 47/063 |
| | | | 222/529 |
| 5,785,264 A | 7/1998 | Yang | |
| 6,659,379 B2 | 12/2003 | Chen | |
| 8,141,707 B2 | 3/2012 | Robbins et al. | |
| 8,302,776 B2 | 11/2012 | Lien | |
| 8,668,082 B2 | 3/2014 | Greene et al. | |
| 9,694,933 B2 | 7/2017 | Kocon et al. | |
| 9,717,354 B2 | 8/2017 | Gehl et al. | |
| 9,938,037 B2 | 4/2018 | Kocon et al. | |
| 2001/0051008 A1 * | 12/2001 | Wedi | B65D 33/2533 |
| | | | 383/63 |
| 2002/0088730 A1 * | 7/2002 | Galomb | B65D 33/004 |
| | | | 206/459.5 |
| 2002/0092941 A1 * | 7/2002 | Henderson | A47J 42/50 |
| | | | 241/169.1 |
| 2004/0149135 A1 | 8/2004 | Cai | |
| 2005/0031228 A1 * | 2/2005 | Galomb | B65D 33/25 |
| | | | 383/96 |
| 2007/0068965 A1 | 3/2007 | Von Flotow et al. | |
| 2007/0278131 A1 | 12/2007 | Buchman | |
| 2009/0169693 A1 * | 7/2009 | Hoffman | B65D 77/225 |
| | | | 426/395 |
| 2010/0206756 A1 | 8/2010 | Dunn-rankin | |
| 2012/0243807 A1 * | 9/2012 | Pascoe | B65D 77/225 |
| | | | 383/103 |
| 2013/0048125 A1 * | 2/2013 | Hoffman | B65D 77/225 |
| | | | 137/852 |
| 2013/0139473 A1 * | 6/2013 | Beer | B31B 70/60 |
| | | | 53/452 |
| 2014/0205213 A1 * | 7/2014 | Beer | B65D 77/225 |
| | | | 383/37 |
| 2015/0125099 A1 * | 5/2015 | Ishihara | B65D 31/16 |
| | | | 383/120 |
| 2016/0060018 A1 | 3/2016 | Nawrot | |
| 2016/0135646 A1 * | 5/2016 | Cacciamani | A47J 42/04 |
| | | | 241/100 |
| 2016/0185504 A1 * | 6/2016 | Ito | B65D 81/263 |
| | | | 383/103 |
| 2016/0297590 A1 * | 10/2016 | You | B05B 11/00412 |
| 2017/0368554 A1 * | 12/2017 | Nichols | B02C 18/10 |
| 2018/0079556 A1 * | 3/2018 | Bodington | B65D 81/24 |
| 2018/0148225 A1 * | 5/2018 | Vandamme | B65D 33/007 |
| 2020/0010245 A1 | 1/2020 | Villis | |

* cited by examiner

COFFEE BEAN PACKAGE ASSEMBLY

BACKGROUND

To preserve the freshness of roasted coffee beans, it is recommended to store the beans in an environment that minimizes exposure to air, moisture, heat, and light. Further, roasted coffee beans begin to lose freshness almost immediately after roasting and it is thus also recommended to grind them immediately before commencing a coffee-making process.

Particularly, when traveling or not in a home location (e.g., camping), procuring freshly ground coffee beans can present challenges. A dedicated coffee grinder is an extra item to transport and is easily forgotten. As a result, when traveling, coffee drinkers may resort to instant coffee or other less desirable coffee solutions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Some examples described herein include coffee bean packaging assemblies that integrate a packaging body with a grinding mechanism (e.g., a burr grinder). The example coffee bean assemblies described provide storage advantages (e.g., coffee beans and grinders do not need to be separately stored and located when wanting to dispense freshly ground coffee), as well as travel advantages (e.g., a separate coffee grinder does not need to be remembered packed when traveling).

Furthermore, a described example also allows an assembly to stand (or be stored) in vertically oriented or upright position in which beans are fed from an interior of a flexible package body, into a mouth of a grinder so that the grinder is maintained in a primed state when the coffee bean assembly is stored or located on a flat surface. The example coffee bean assemblies may also include a clear or transparent window into the interior of the assembly so that a user can conveniently assess a number of coffee beans remaining within the assembly. A degassing valve also provides for convenient degassing of the interior of an example coffee bean packaging assembly so as to preserve the freshness of coffee bean stored therein.

Figure 1:
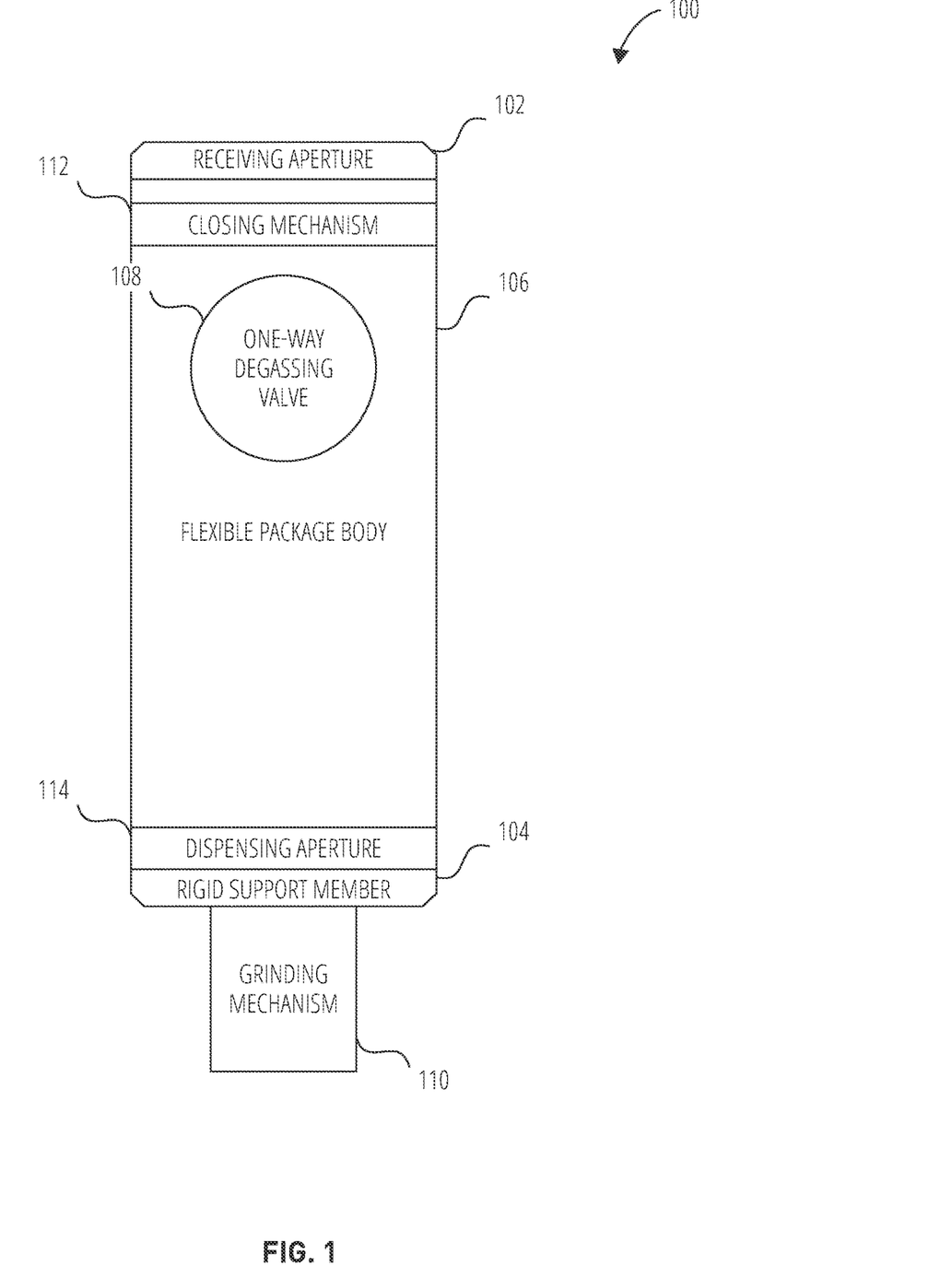
FIG. 1 illustrates a coffee bean package assembly 100 in accordance with some examples.

FIG. 1 is a schematic diagram illustrating a front view of a coffee bean package assembly 100, according to some examples, which includes a flexible package body 106 having a receiving aperture 102 defined at or adjacent one free end thereof, and a dispensing aperture 114 defined at or adjacent the other free end thereof. During a filling operation, coffee beans are dispensed into the interior of the flexible package body 106 via the receiving aperture 102, and during a dispensing operation, coffee beans are dispensed from the interior of the flexible package body 106 via the dispensing aperture 114.

The receiving aperture 102 and the dispensing aperture 114 may each extend across the lateral width of the flexible package body 106 at the respective free ends thereof. The flexible package body 106 also has a valve aperture defined therein.

The flexible package body 106 is, in some examples, rectangular in shape and constructed of a plastics material having a transparent portion that is transparent, or at least semitransparent, so as to make the coffee beans within the flexible package body 106 visible to a user from the exterior of the flexible package body 106. Additionally, the flexible package body 106 may have an opaque portion constructed of an opaque plastics material, and labeling may be applied to this opaque portion. As will be described with reference to further figures, the transparent portion may define a window into the interior of the flexible package body 106 that extends longitudinally along the length of a side panel of the flexible package body 106.

A closing mechanism 112, in the form of a flexible clamp or a sealable plastic zipper, is provided at or adjacent the receiving aperture 102 order to close (and seal or make airtight) the receiving aperture 102. For example, where the closing mechanism 112 is a flexible clamp, a free end of the flexible package body 106, within which the receiving aperture 102 is defined, may be folded over a number of times, and this folded state held or secured by the flexible clamp. This multiple folding of the free end, and securing in a folded state, may serve to close the receiving aperture 102 in an airtight manner. Similarly, where the closing mechanism 112 is a sealable plastic zipper, this may be closed to provide an airtight seal of the receiving aperture 102.

At a second, opposite free end of the flexible package body 106, a dispensing aperture 114 is defined within the flexible package body 106, this dispensing aperture 114 extending the full width of the free end of the flexible package body 106. A rigid support member 104 is secured to the flexible package body 106 around a dispensing aperture 114, and secured (e.g., glued or thermally welded) to the flexible package body 106. The rigid support member 104 may be formed from a rigid, molded plastics material, and have a wide mouth at one end into which the second free end of the flexible package body 106 is received and secured, and a second narrower outlet to which is secured a grinding mechanism 110.

The grinding mechanism 110 may be a burr grinder and may be either manually operated or electrically powered. The grinding mechanism 110 grinds coffee beans funneled during a dispensing operation from within the flexible package body 106, through the dispensing aperture 114 and the rigid support member 104, by gravity into an inlet of the grinding mechanism 110. In some examples, the grinding mechanism 110 has an exterior rotating sleeve or cuff that rotates an interior burr of the grinding mechanism 110 order to grind coffee beans to a specific granularity.

It will be noted that the handle grinding mechanism 110 has a flat head portion that, together with the rigid support member 104, enables the coffee bean package assembly 100 to stand in a vertically oriented position on a flat surface. By standing the coffee bean package assembly 100 in this way, the coffee bean package assembly 100 can be conveniently stored and also made accessible on a flat surface when in use. Standing the coffee bean package assembly 100 in a vertically oriented position, or upright position, also promotes the feeding of coffee beans from an interior of the flexible package body 106, through the dispensing aperture 114 and rigid support member 104, into the intake of the grinding mechanism 110. In some examples, flanges or other support members may extend from the grinding mechanism 110 in order to enhance the stability of the coffee bean package assembly 100 when resting on a flat surface in the vertically oriented position.

The coffee bean package assembly 100 is also shown to have a one-way degassing valve 108, which is secured over a valve aperture (not shown) defined in the flexible package body 106 so as to enable degassing (e.g., the expulsion of air) from within the flexible package body 106. A user may, for example, manually compressed the flexible package body 106 in order to expel air from the interior of the flexible package body 106 and thus seek to preserve the freshness of coffee beans within the flexible package body 106. The one-way degassing valve 108 is located towards the upper free end of the flexible package body 106, where the flexible package body 106 is more flexible, and compression of the flexible package body 106 is not impeded by the rigid support member 104.

It should be noted that the receiving aperture 102, which is resealable, allows the coffee bean package assembly 100 to be conveniently refilled and reused, without interference to the dispensing of coffee beans through the dispensing aperture 114, or requiring that the grinding mechanism 110 be detached from the coffee bean package assembly 100. Thus, having the receiving aperture 102 separate and distinct from the dispensing aperture 114 provides some distinct operational advantages.

Figure 2:
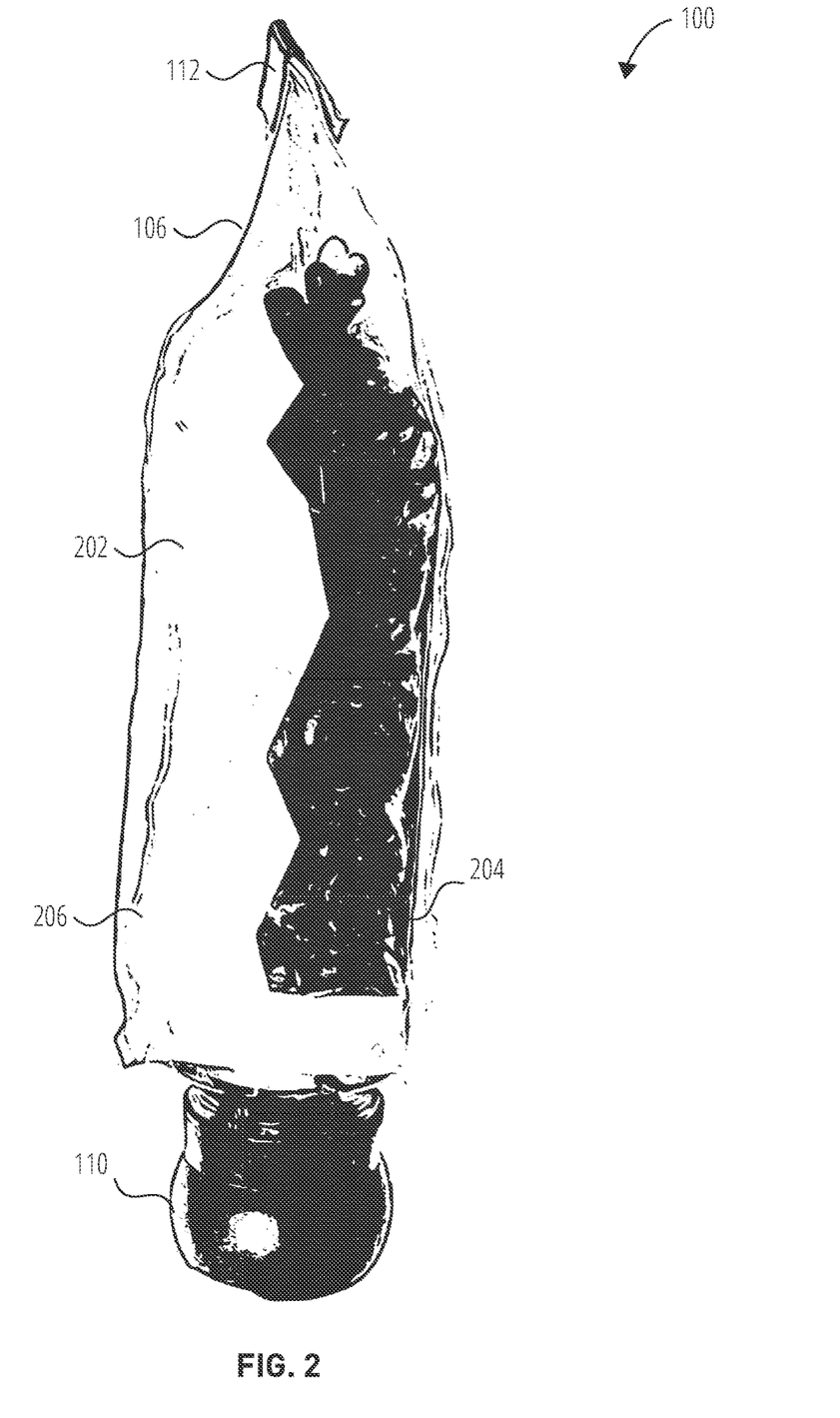
FIG. 2 illustrates a coffee bean package assembly 100 in accordance with some examples.

FIG. 2 is a first side view of the coffee bean package assembly 100, according to some examples, and shows that a side panel 202 of the flexible package body 106 includes an opaque portion 206 and a transparent portion 204, with coffee beans accommodated within the interior of the flexible package body 106 being visible through the transparent portion 204. The border of the opaque portion 206 and transparent portion 204 is ornamentally shaped in a zigzag pattern, and product details may be printed on the opaque portion 206.

FIG. 2 also shows a grinding mechanism 110, in the form of a manually often operated burr grinder having an external cuff or sleeve that is rotatable to grind coffee beans entering the grinding mechanism 110 through an inlet that is open to the interior of the flexible package body 106.

Figure 3:
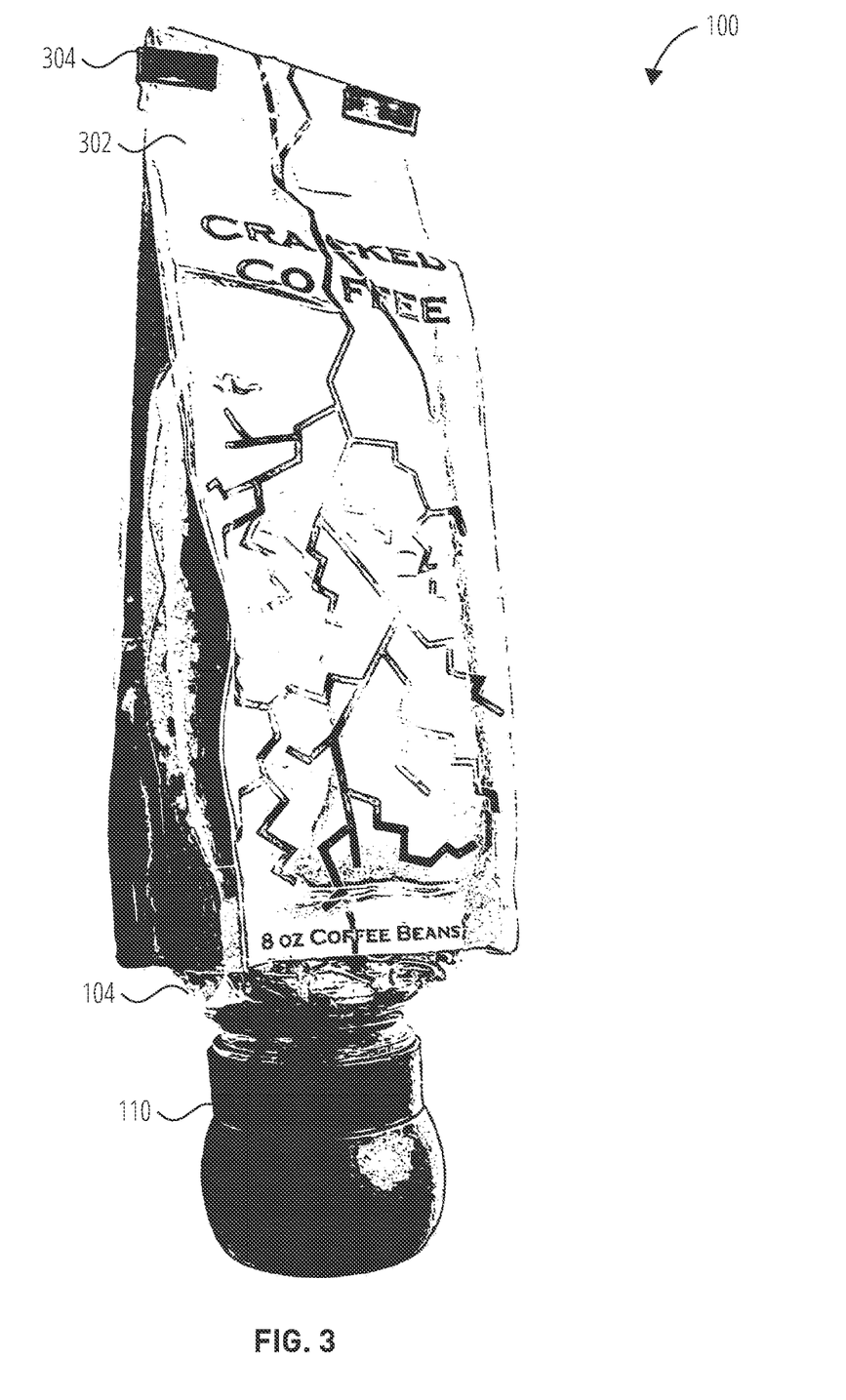
FIG. 3 illustrates a coffee bean package assembly 100 accordance with some examples.

FIG. 3 is a perspective view of a coffee bean package assembly 100, according to some examples, and illustrates that the flexible package body 106 may include a pair of side panels (including side panel 202) secured between a front panel 302 and a rear panel (not shown). The front panel 302 is opaque and has product labeling applied thereto. FIG. 3 also shows further details of a closing mechanism including a flexible clamp 304, which secures an upper free end of the flexible package body 106 in a folded and sealed state. Details of an example rigid support member 104 are also shown in FIG. 3.

Figure 4:
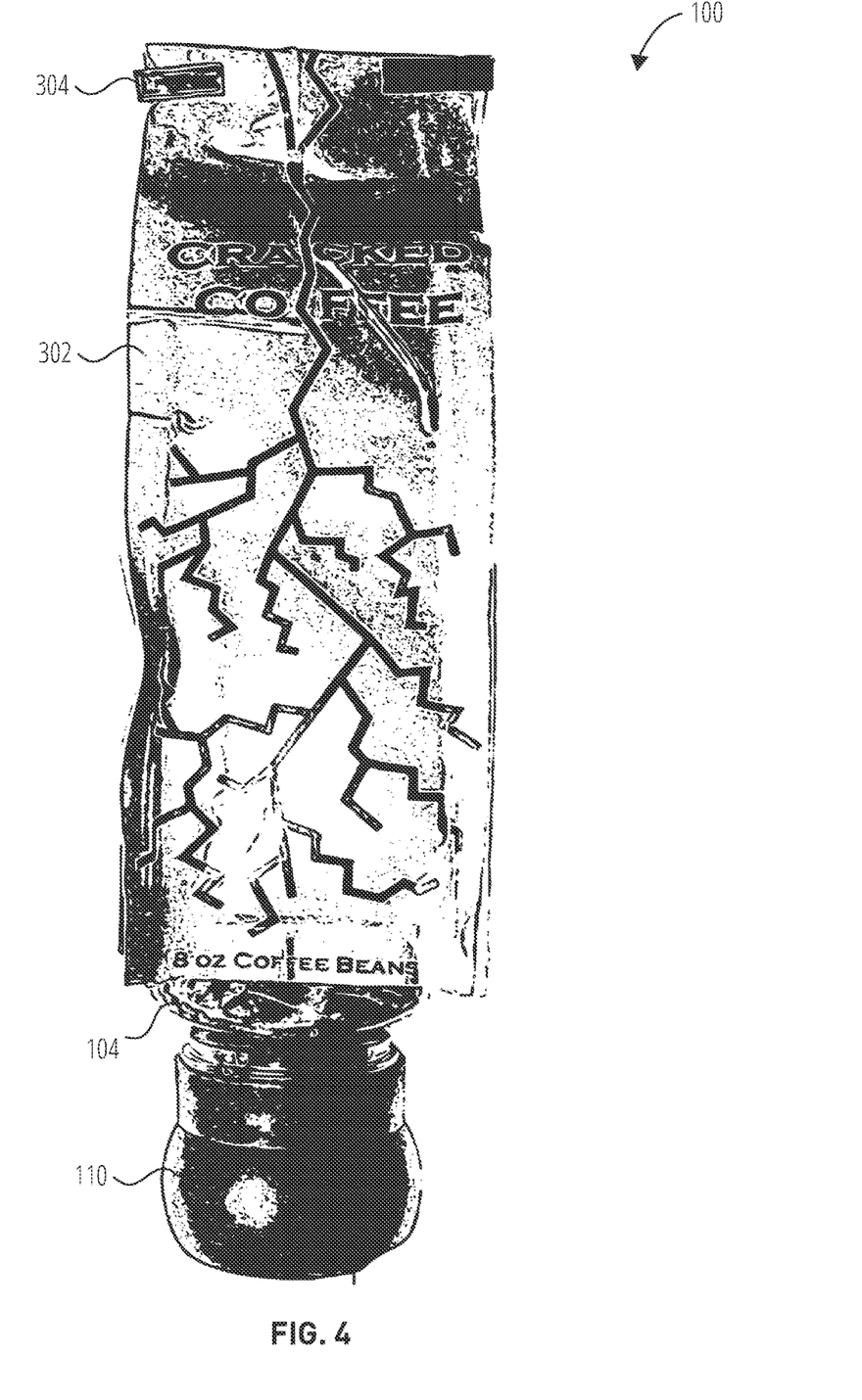
FIG. 4 illustrates a coffee bean package assembly 100 in accordance with some examples.

FIG. 4 is a front view of a coffee bean package assembly 100, according to some examples, and illustrates further details of the front panel 302, rigid support member 104, and a grinding mechanism 110.

Figure 5:
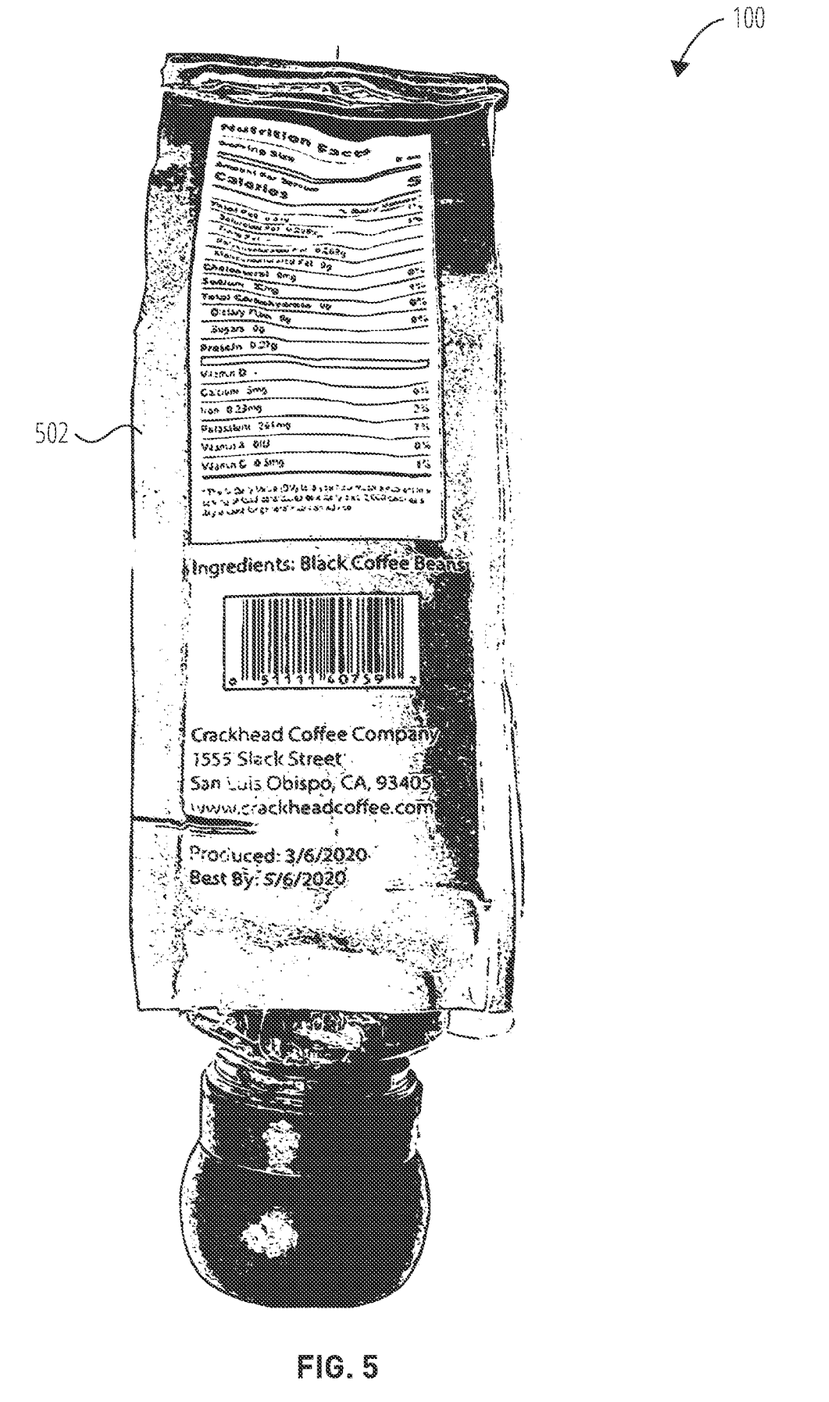
FIG. 5 illustrates a coffee bean package assembly 100 in accordance with some examples.

FIG. 5 is a rearview of a coffee bean package assembly 100, according to some example examples, and illustrates a rear panel 502 of the flexible package body 106, as well as a different view of an upper end of the flexible package body 106 in a folded and sealed state, as secured by a flexible clamp 304.

Figure 6:
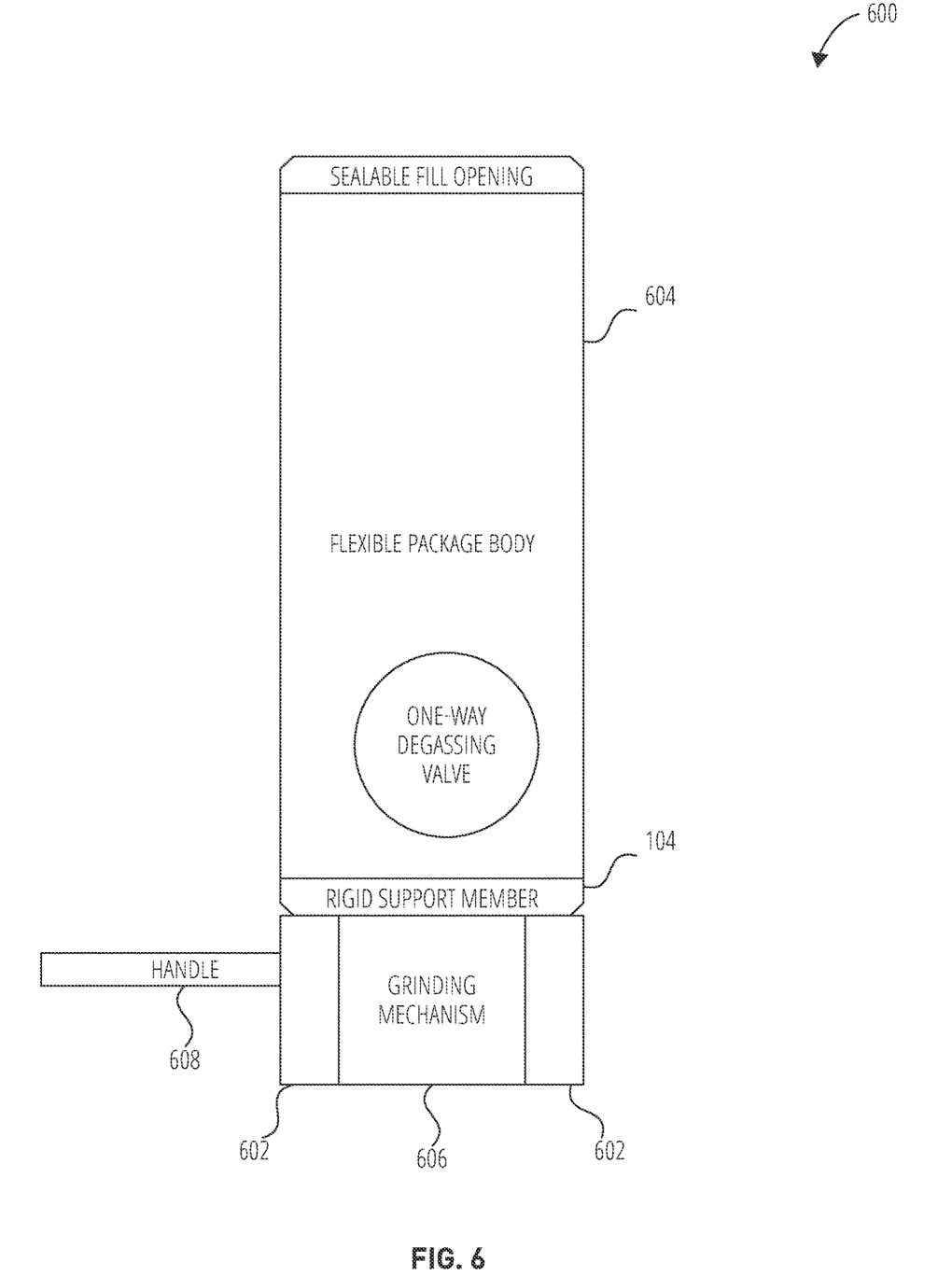
FIG. 6 illustrates a coffee bean package assembly 100 in accordance with some examples.

FIG. 6 is a schematic diagram showing a front view of a coffee bean package assembly 600, according to some examples, having a manually operated grinding mechanism 606 (e.g., a burr grinder) having a different rotation mechanism than that of the example in FIG. 1. Specifically, the burrs or abrasive surfaces of the grinding mechanism 606 are rotated by a user, using a handle 608, which is coupled to the grinding mechanism 606 by a ratchet 602. The ratchet 602 imparts rotation from the handle 608 to the grinding mechanism 606 only in one direction, so as to allow convenient, leveraged rotational movement to be imparted to the grinding mechanism 606 using the handle 608, without requiring that the handle be rotated through a full 360 degrees. The handle 608 may furthermore be attached by a pivot or hinge to the ratchet 602, so that the handle can be stowed in a folded position, substantially flush with a flexible package body 604 of the flexible package body 604

Figure 7:
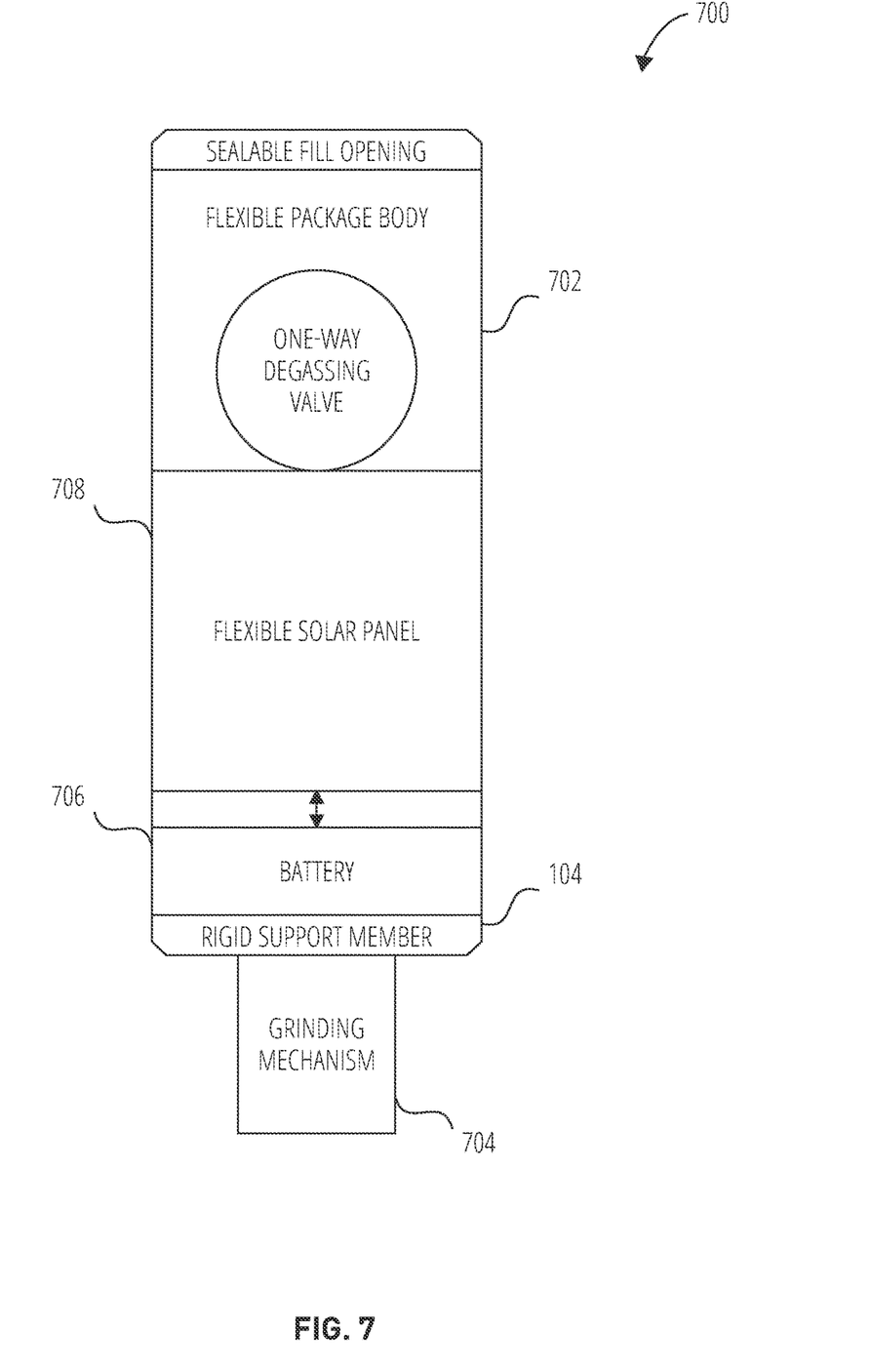
FIG. 7 illustrates a coffee bean package assembly 100 in accordance with some examples.

FIG. 7 is a schematic diagram showing a front view of a coffee bean package assembly 700, having an electrically operated grinding mechanism 704 (e.g., a burr grinder). The electrically operated grinding mechanism 704 includes an electric motor (not shown), which rotates one or more burrs or abrasive surfaces of the grinding mechanism 704 to grind coffee beans, fed from within a flexible package body 702, to a desired granularity determined in part by a spacing between the burrs or abrasive surfaces. The electric motor of the grinding mechanism 704 is electrically coupled to and powered by a battery 706, which is shown to be secured and accommodated within an interior of the flexible package body 702. In some examples, the battery 706 may also be housed within the grinding mechanism 704 itself.

The battery 706 is, in turn, electrically coupled to a flexible solar panel 708 that is removably secured to an outer surface of the flexible package body 702. The flexible solar panel 708 operationally allows for the battery 706 to be charged. The flexible solar panel 708 may operationally be removed from the flexible package body 702 in order to be placed in a position for exposure to sunlight, for example, while camping.

Figure 8:
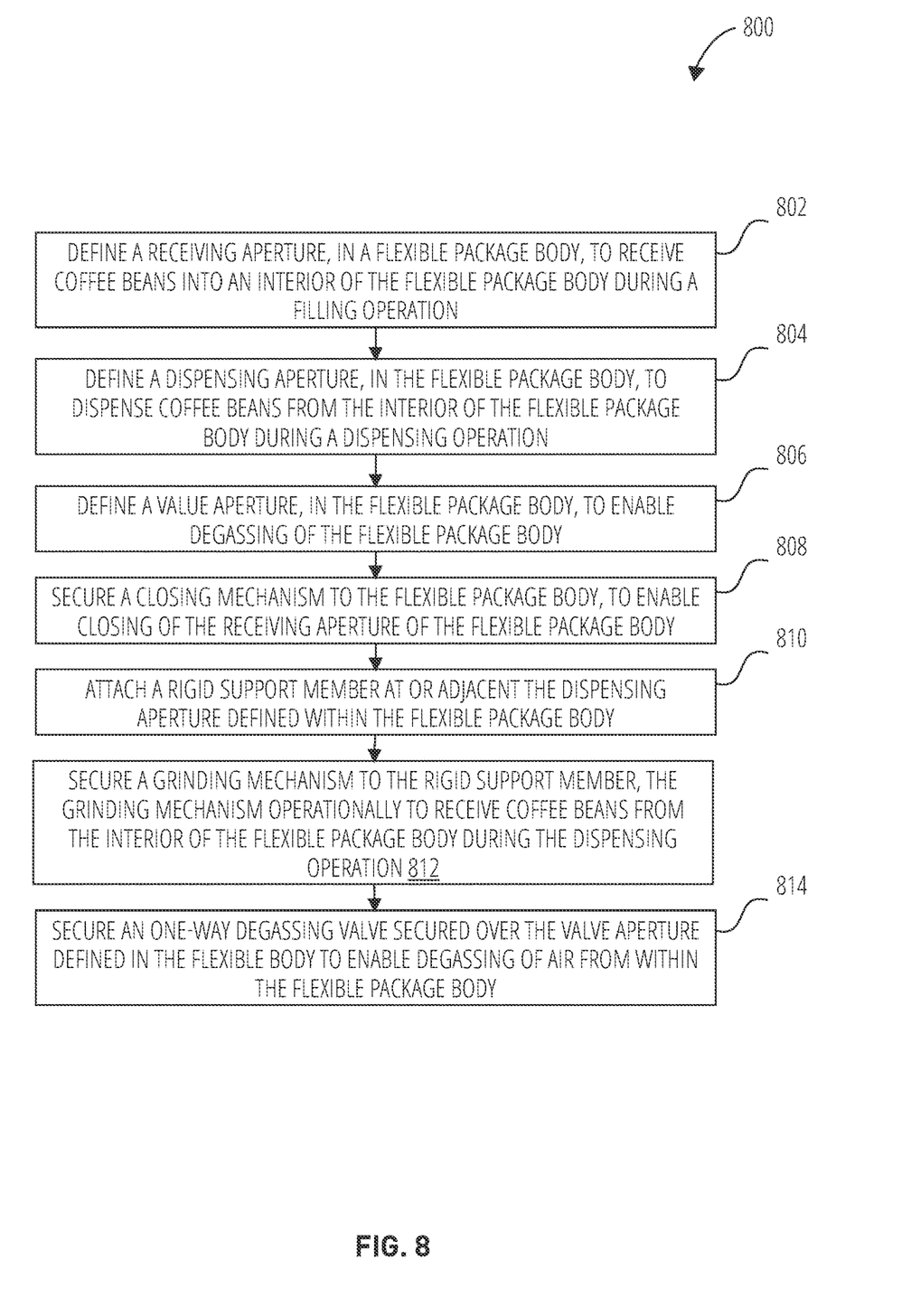
FIG. 8 illustrates a method 800 in accordance with one example.

FIG. 8. is a flowchart illustrating a method 800, according to some examples, to manufacture a coffee bean package assembly, such as those illustrated in the accompanying figures.

The method 800 commences at block 802, with the definition of a receiving aperture, in a flexible package body, to receive coffee beans into an interior of the flexible package body during a filling operation. The receiving aperture may be defined at or adjacent an upper free end of the flexible package body.

At block 804, a dispensing aperture is defined, in the flexible package body, to dispense coffee beans from the interior of the flexible package body during a dispensing operation. The dispensing aperture may be defined at or adjacent a lower free end of the flexible packaging body, the lower free end being opposite the upper free end.

For example, the flexible package body may be manufactured from a continuous pipe or tube of plastics material, and the receiving aperture and the dispensing aperture may be defined by cutting the continuous tube into predefined lengths, with the open ends of each cut section of the tube respectively being the receiving aperture and the dispensing aperture. In other examples, specific apertures may be defined at or adjacent free ends of a section of plastic body that defines the package body.

At block 806, a value aperture is defined in the flexible package body, the valve aperture to enable degassing of the flexible package body. The valve aperture may be defined in a main panel (e.g., a front panel or rear panel) of the flexible package body, towards the upper free end of the flexible package body.

At block 808, a closing mechanism is secured to the flexible package body to enable closing of the receiving aperture of the flexible package body. The closing mechanism may, in one example, be a flexible clamp to clamp the upper free end, and accordingly, also the receiving aperture closed. Specifically, the flexible clamp may operationally hold the upper free end of the flexible package body in a folded state to thereby to close the receiving aperture. The closing mechanism may, in another example, be a sealable zipper that is located at or adjacent to the upper free end of the flexible package body, with the zipper being thermally welded into the receiving aperture to allow the receiving aperture to be selectively opened and closed by the zipper.

At block 810, a rigid support member, in the example form of a funnel, is secured at or adjacent to the dispensing aperture defined within the flexible package body. The rigid support member may be a thermally molded rigid plastic component that is snuggly received within the dispensing aperture and sealed or welded in place within the dispensing aperture, so as to allow coffee beans from within the flexible packaging body to pass through the dispensing aperture and into a mouth of the rigid support member. Operationally, coffee beans may be funneled through the rigid support member and to an outlet defined by the rigid support member. While the rigid support member is shown in the accompanying figures to comprise a funnel, in other examples, a planar rigid panel or board having a hole defined therein is used as the rigid support member.

At block 812, a grinding mechanism is attached to the rigid support member, the grinding mechanism operationally to receive coffee beans, potentially via the rigid support member where this is a funnel, from the interior of the flexible package body during the dispensing operation. As noted above, the grinding mechanism may be a manually powered burr grinder or an electrically powered burr grinder. In the case of an electrically powered burr grinder, a battery is secured to or within the coffee bean package assembly and electrically coupled to the grinder. The battery may, for example, be secured within the flexible package body itself, or within the casing of the grinding mechanism. Further, a flexible solar charging sheet may be attached to an outer surface of the flexible packaging body, and electrically coupled to the battery, in order to provide charge to the battery.

At block 814, a one-way degassing valve is secured over (or within) the valve aperture defined in the flexible body to enable degassing of air from within the flexible package body.

What is claimed is:
1. A coffee bean package assembly comprising:
   a flexible package body having a receiving aperture defined therein to receive coffee beans into an interior of the flexible package body during a filling operation, a dispensing aperture defined therein to dispense the coffee beans from the interior of the flexible package body during a dispensing operation, and a valve aperture to enable degassing of the flexible package body;
   a closing mechanism to close the receiving aperture of the flexible package body;
   a rigid support member secured around the dispensing aperture within the flexible package body;
   an electrically-powered grinder secured to the rigid support member, and to operationally receive the coffee beans from the interior of the flexible package body during the dispensing operation;
   a battery located within the interior of the flexible package body and electrically coupled to the electrically-powered grinder; and
   a one-way degassing valve secured over the valve aperture defined in the flexible package body to enable degassing of air from within the flexible package body.

2. The coffee bean package assembly of claim 1, wherein the receiving aperture is defined at a first free end of the flexible package body, and the closing mechanism is a flexible clamp to hold the first free end of the flexible package body in a folded state to thereby close the receiving aperture.

3. The coffee bean package assembly of claim 1, wherein the closing mechanism is a sealable plastic zipper.

4. The coffee bean package assembly of claim 1, wherein the dispensing aperture is defined at a second free end of the flexible package body, and the rigid support member extends longitudinally from the second free end.

5. The coffee bean package assembly of claim 1, further comprising a flexible solar charging sheet that is secured to an outer surface of the flexible package body, and that is electrically coupled to the battery.

6. The coffee bean package assembly of claim 1, wherein the flexible package body comprises a transparent portion that allows visibility into the interior of the flexible package body.

7. The coffee bean package assembly of claim 6, wherein the transparent portion extends longitudinally along at least one side of the flexible package body.

8. The coffee bean package assembly of claim 1, wherein the electrically-powered grinder has a flat head portion that enables the coffee bean package assembly to stand in an upright position on a surface.

\* \* \* \* \*